(12) United States Patent
Goatley

(10) Patent No.: US 6,846,267 B1
(45) Date of Patent: Jan. 25, 2005

(54) GEARBOX ADAPTOR

(75) Inventor: Ernest Paul Goatley, Balclutha (NZ)

(73) Assignee: Goatley Technology Developments LTD, Tauranga (NZ)

( * ) Notice: Subject to any disclaimer, the term of this patent is extended or adjusted under 35 U.S.C. 154(b) by 0 days.

(21) Appl. No.: 09/744,515
(22) PCT Filed: Jul. 26, 1999
(86) PCT No.: PCT/NZ99/00114
§ 371 (c)(1),
(2), (4) Date: Jan. 23, 2001
(87) PCT Pub. No.: WO00/06927
PCT Pub. Date: Feb. 10, 2000

(30) Foreign Application Priority Data

Jul. 28, 1998 (NZ) .............................................. 331192

(51) Int. Cl.[7] .......................... B60K 41/02; F16D 19/00; F16H 3/22
(52) U.S. Cl. .......................... 477/79; 192/87.18; 74/346
(58) Field of Search .......................... 74/325, 335, 346; 192/87.15, 87.18, 3.58; 477/70, 79, 181; 701/52

(56) References Cited

U.S. PATENT DOCUMENTS

| | | | |
|---|---|---|---|
| 3,059,743 A | | 10/1962 | McNamara |
| 3,899,938 A | * | 8/1975 | Crabb ........................ 475/249 |
| 4,462,271 A | * | 7/1984 | Stieg ........................... 475/86 |
| 4,718,302 A | * | 1/1988 | Nussbaumer et al. ... 192/85 CA |
| 4,843,902 A | | 7/1989 | Patton et al. .................. 20/335 |
| 5,024,634 A | * | 6/1991 | Blessing ..................... 475/249 |
| 5,390,560 A | * | 2/1995 | Ordo ........................... 74/329 |
| 5,480,014 A | | 1/1996 | Barton et al. |
| 6,022,295 A | * | 2/2000 | Liu ............................. 477/180 |

FOREIGN PATENT DOCUMENTS

| | | |
|---|---|---|
| DE | 1913064 | 9/1970 |
| DE | 3838708 A1 | 7/1989 |
| JP | 09112636 A | 5/1997 |

* cited by examiner

Primary Examiner—Matthew C. Graham
Assistant Examiner—Xuan Lan Nguyen
(74) Attorney, Agent, or Firm—Christie, Parker & Hale, LLP

(57) ABSTRACT

A gearbox adaptor (2) which can be combined with a standard vehicle gearbox to convert a standard gearbox to a sequential gearbox. Some or all of the gears (5, 6) of a standard gearbox have the synchro-hubs and cones removed and one or more gearbox adaptors (2) substituted. Each adaptor (2) includes a hub (4) which engages the gear shaft (3), at least one piston (7, 8) mounted within the hub (4), means for supplying fluid (16) from the exterior of the hub (4) to a first face of the or each piston (7, 8), at least one clutch means (9, 10), part of which engages the hub and another part of which engages a gear (5, 6) located on the gear shaft (3); the arrangement being such that movement of the piston (7, 8) in a predetermined first direction interengages the parts of the clutch (9, 10) to drivingly engage the gear (5, 6) and the gear shaft (3).

32 Claims, 2 Drawing Sheets

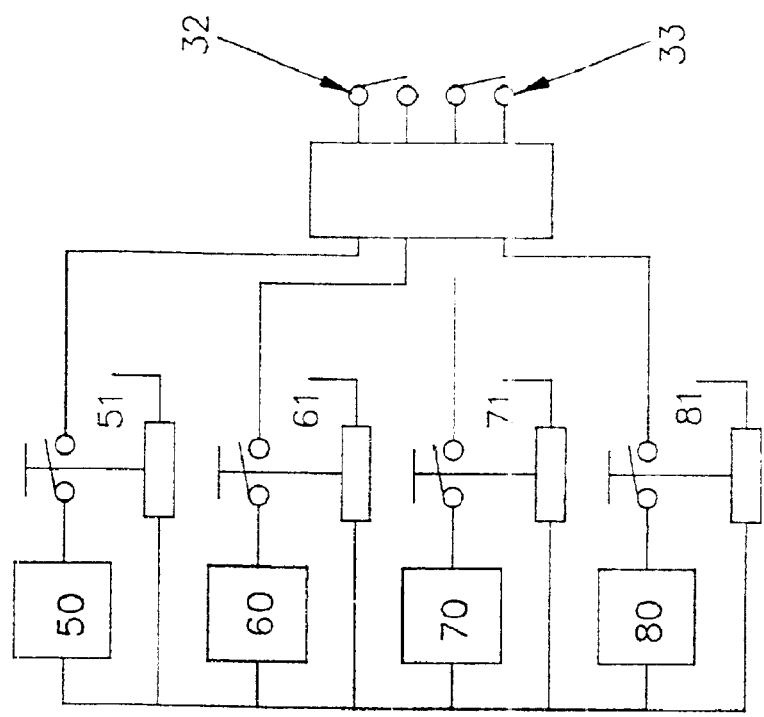
Fig. 3.
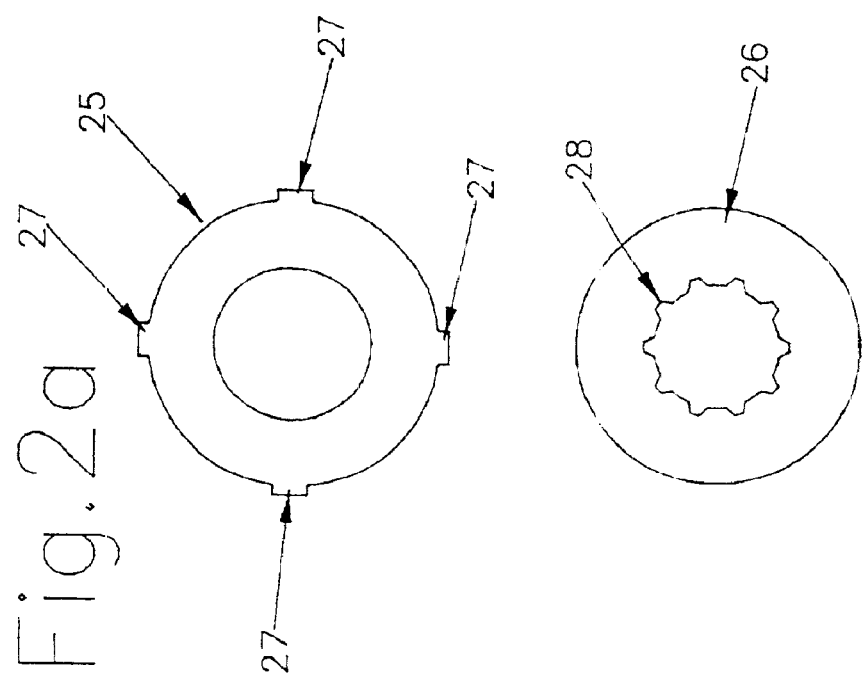
Fig. 2a.
Fig. 2b.

GEARBOX ADAPTOR

TECHNICAL FIELD

The present invention provides a gearbox adaptor including: a hub adapted to be engageable with a gear shaft for rotation therewith; at least one piston mounted with said hub; means for supplying fluid from the exterior of the hub to a first face of the or each said piston, so as to move said piston in a first direction; at least one clutch means adjacent the or each said piston, part of the or each said clutch means being engaged with said hub and a different part of the or each said clutch means being engageable with a gear locatable on said gear shaft adjacent said hub; said gear being freely rotatable relative to said shaft, said clutch means being located and arranged such that movement of said piston in said first direction inter-engages said parts of said clutch to drivingly engage said gear with said gear shaft.

Sequential gearboxes are especially useful in racing and rally cars, where rapid gear changes without looking at the gear-lever are essential.

BACKGROUND ART

Purpose-built sequential gear boxes are known, but are much more expensive than standard gearboxes. Further, known sequential gearboxes provide a comparatively slow gear-change:—the engine must be unloaded to change gear, and the car therefore decelerates for the period of the gear change, (typically about 0.1 sec.), resulting in a loss of speed of the order of 3.5 kph.

It is therefore an object of the present invention to provide a gearbox adaptor which is capable of insertion into a standard gearbox to convert it to a sequential gearbox, the combination of providing a sequential gearbox in which gear changes can be made rapidly (typically 0.02 sec.) and at full throttle, so that the car does not lose speed during a gear change.

DISCLOSURE OF INVENTION

The present invention provides a gearbox adaptor including: a hub adapted to be engageable with a gear shaft for rotation therewith; at least one piston mounted within said hub; means for supplying fluid from the exterior of the hub to a first face of the or each said piston, so as to move said piston in a first direction; at least one clutch means adjacent the or each said piston, part of the or each said clutch means being engaged with said hub and a different part of the or each said clutch means being engageable with a gear locatable on said gear shaft adjacent said hub; the or each said clutch means being located and arranged such that movement of said piston in said first direction inter-engages said parts of said clutch to drivingly engage said gear and said gear shaft.

Preferably, the piston and clutch means both are annular and are concentric with each other and with the hub. Preferably, the hub is concentrically engageable with the gear shaft.

Preferably the adaptor further comprises a casing surrounding at least part of the exterior of said hub, said casing being mounted upon said hub but not rotatable therewith; at least one first fluid passage being formed between the interior of the casing and the exterior of the hub, the or each said first fluid passage being in communication with said means for supplying fluid to a first face of the or each said piston, which comprises at least one second fluid passage formed through said hub.

It is known to provide a hydraulically operated piston, clutch, and hub system for a gearbox, but known systems supply hydraulic fluid through the gear shaft This arrangement cannot be used to adapt existing gearboxes, since in existing standard gearboxes, the shafts are not provided with hydraulic passages.

The present invention further provides a sequential gearbox as defined above which includes a standard gearbox from which the synchro-hubs and cones have been removed and a gearbox adaptor in accordance with the present invention has been fitted to each gear. It is possible to use an adaptor of the present invention to adapt each gear individually, but preferably the double adaptor of the present invention is used, with each double adaptor being fitted between each pair of adjacent gears in the standard gearbox.

Preferably, all of the gears of a standard gearbox are adapted to the present system, but it is also possible to adapt only some of the gears of a standard gearbox, and leave the remaining gear or gears to be operated in known manner.

The sequential gearbox described above preferably includes electronic control means which comprises two micro switches which are connected via a sequencing arrangement to a set of solenoid valves, one solenoid valve being connected to the means for supplying fluid to each piston such that fluid is supplied to said piston when said solenoid valve is open and fluid is withdrawn from said piston when said solenoid valve is closed; the control means being such that each time the first micro switch is closed, the sequencing arrangement closes any solenoid valve which is open and opens the next solenoid valve in a predetermined first sequence, and each time the second micro switch is closed, the sequencing arrangement closes any solenoid valve which is open and opens the next solenoid valve in a predetermined second sequence.

Preferably, the or each clutch means comprises a clutch pack which consists of a first series of spaced plates each of which is engageable with the hub for rotation therewith but which is reciprocable parallel to the longitudinal axis of said hub; and a second series of spaced plates each of which is engageable with a gear mounted upon said gear shaft but which is reciprocable parallel to the longitudinal axis of said hub; said second series of plates being interleaved with the plates of said first series.

BRIEF DESCRIPTION OF DRAWINGS

By way of example only, a preferred embodiment of the present invention is described in detail, with reference to the accompanying drawings, in which:

FIGS. 2a and 2b are plan views of two clutch components; and

FIG. 3 is a block diagram showing the electronic controls.

BEST MODE OF CARRYING OUT THE INVENTION

Figure 1:
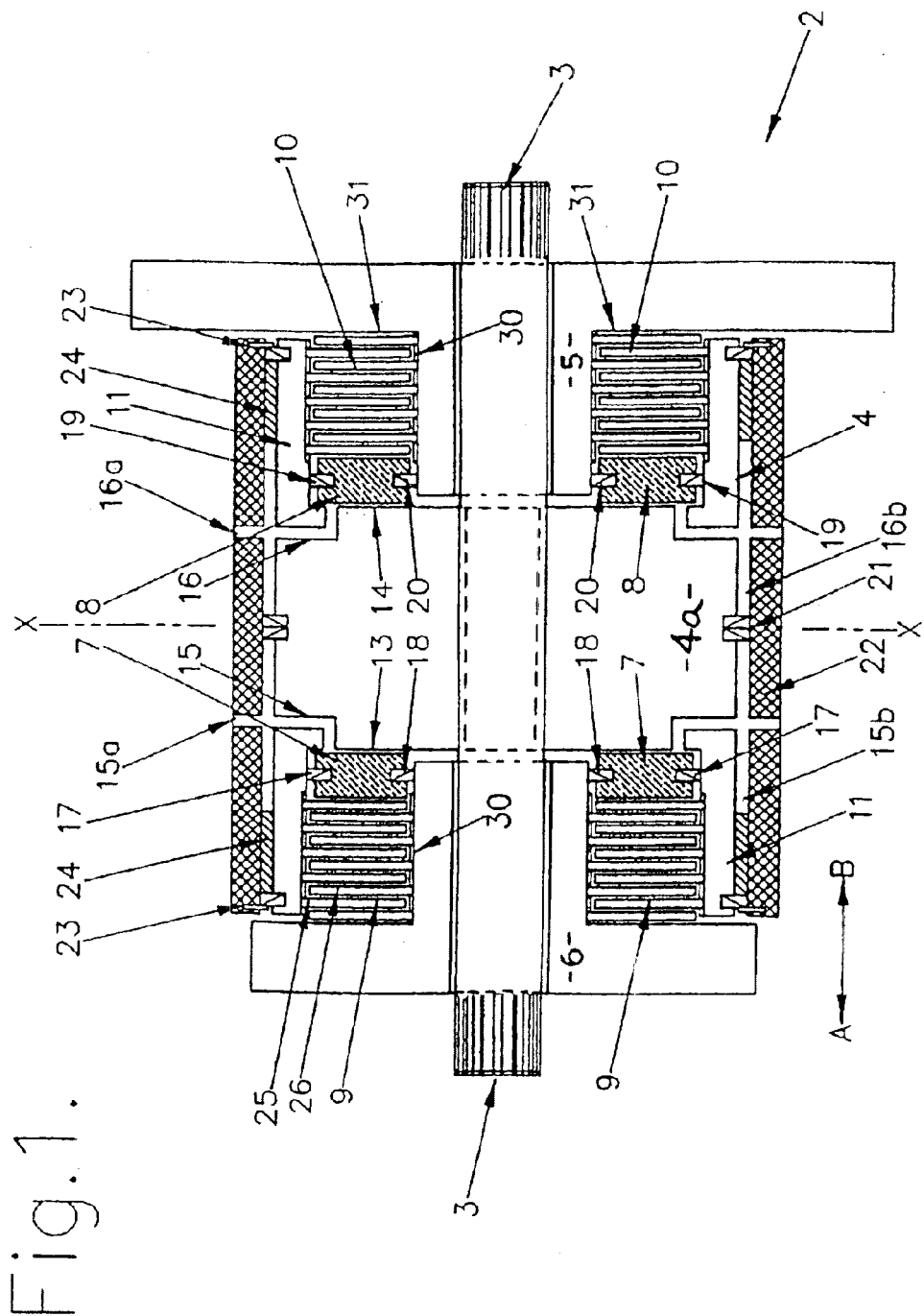
FIG. 1 is a schematic sectional view through part of a gearbox adaptor in accordance it with the present invention, the adaptor being for a pair of gears.

Referring to FIGS. 1 and 2 of the drawings, a gearbox adaptor 2 comprises a central splined shaft 3 upon which are mounted a hub 4, a first gear 5, a second gear 6, two pistons 7, 8 and two clutch packs 9, 10.

The shaft 3 is the main shaft of a standard gearbox and is externally splined, and driven in known manner. The hub 4 is internally splined and the hub splines engage the splines of the shaft 3 so that the hub 4 rotates with the shaft 3.

The first and second gears 5, 6 are gears of known type, forming part of a standard gearbox and are freely rotatable relative to the shaft 3, but are fixed in position relative to the length of the shaft 3.

The hub 4 has a central portion 4a concentric with the shaft 3, with a rim 11 around the periphery of said central portion. The rim 11 is of greater width than the central portion 4a.

The extension of the rim beyond the central portion of the hub provides two annular recesses in which the pistons 7, 3 and the clutch packs 9, 10 are mounted, concentric with the shaft 3.

Each piston 7, 8, is annular and is mounted adjacent one side of the central portion 4a of the hub, spaced from the hub by a passage 13, 14 respectively. The passages 13, 14 are connected to corresponding passages 15, 16 in the hub 4, through which hydraulic fluid can be supplied to the passages 13, 14, as hereinafter described.

Pairs of annular seals 17, 18, 19, 20 respectively, seal the gaps between the edges of the pistons 7, 8 and the adjacent walls of the gears and the hub respectively.

A further annular seal 21 (e.g. a cast-iron seal ring) extends around the outer wall of the rim between the passages 15 and 16. The seal 21 extends between the outer wall of the rim and a casing 22 which surrounds the hub 4 and is located on the hub by circlips 23. Bushes 24 may be located between the opposed faces of the hub 4 and casing 22, to permit the casing 22 to remain stationary while the hub 4 rotates. Alternatively, the bushes 24 may be omitted since the combination of the seal 21 and the layer of hydraulic fluid in the passages 15b, 16b between the outer wall of the rim and the inner wall of the casing 22 effectively acts as a bearing in practice.

Fluid passage 15a, 16a, corresponding to passages 15 and 16 are formed in the casing 22, for supply of hydraulic fluid, and as seen in the drawing extend in a direction substantially perpendicular to the shaft axis.

Each clutch pack 9, 10 comprises a series of annular steel plates 25 interleaved alternately with a series of annular bronze plates 26. Each steel plate 25 is formed with four equidistantly-spaced dogs 27 (FIG. 2a only) which are dimensioned and arranged to engage corresponding grooves (not shown) in the adjacent face of the rim 11, so that the steel plates rotate with the hub but can move relative to the hub in the directions indicated by arrows A and B.

Alternatively, the steel plates 25 may be formed with external splines instead of the dogs 27, splines engaging corresponding splines formed in the rim 11.

Each bronze plate 26 is formed with splines 28 around its inner periphery. The splines 28 are received in corresponding grooves (not shown) on the adjacent portions 30 of the gears 5, 6, so that the bronze plates 26 rotate with the gears 5, 6, but can move relative to the gears in the directions of arrows A and B.

It will be appreciated at the bronze plates be formed with dogs rather than splines. Further, the materials of which the clutch pack plates are made can be varied:—any suitable materials having acceptable wear characteristics and providing a good frictional grip, may be used (e.g. carbon fibre, sintered bronze).

To convert the whole of a standard gearbox using the present invention, all of the synchro-hubs and cones are removed from the standard box, and a gearbox adaptor as described above is fitted between each pair of gears: first/second and third/fourth. For reverse gear, the standard clutch system may be retained, or a single gear adaptor as hereinafter described, can be used. If the standard gearbox has an odd number of forward gears, then either the standard clutch system is used for the 'odd' gear or a single gear adaptor can be used.

To modify the above-described adaptor for a single gear, the hub shown in FIG. 1. is effectively split in two, by terminating the hub on a line X—X an FIG. 1, with a blank wall. This gives a single gear adaptor. It is possible to use a single-gear adaptor for each gear in a multi-gear box, but it is preferred to use two-gear adaptors as shown in FIG. 1, since this gives a more compact construction.

It also is possible to construct an adaptor as a single unit for three or more gears, by extending the design of FIG. 1. Further, although the invention is described as an adaptor for an existing gearbox, it will be appreciated that it is possible to build a gearbox 'from scratch' incorporating the adaptor of the present invention. The above-described system can be controlled by any suitable control, but preferably is controlled by an electronic/hydraulic system as shown in FIG. 3.

The control system includes an electronic joystick (not shown) which is connected to a first and a second microswitch 32, 33 such that when the joystick is moved in one direction, the first micro-switch 32 is closed, and when the joystick is moved in the opposite direction, the second micro-switch 33 is closed. The micro-switches 32, 33 are connected to a series of solenoid valves 50,60,70,80, each controlling the flow of hydraulic fluid to one section of one of the hubs 4, via a series of relays 51,61,71,81 and a sequencing arrangement (e.g. a control integrated circuit) which provide that each time the first micro-switch 32 is closed, the next solenoid in the sequence 50,60,70,80 is opened and each time the second micro-switch 33 is closed, the next solenoid in the sequence 80,70,60,50 is opened.

When the first solenoid valve is opened, hydraulic fluid is supplied through that valve to one of the passages 16a and hence to the associated passages 16 and 14, to push the piston 8 in the direction of arrow B. The piston 8 contacts the plates of the clutch pack 10 and pushes them in the same direction, urging the plates of the clutch pack into contact with each other and with the face 31 of the first gear. Since the plates 25 of the clutch pack are splined to the hub 4 and the plates 26 to the gear 5, and the hub 4 is splined to the shaft 3, pushing the plates 25, 26 together into driving contact with each other brings the first gear 5 into driving engagement with the shaft 3, and the gear rotates with the shaft, so that the vehicle drives in first gear. When to the second solenoid valve is opened, the electronic control circuit closes the first solenoid. When the first solenoid valve is closed, the rotation of the gearbox tends to fling fluid out of the passages 14/16/16a, drawing the piston 8 back to the position of FIG. 1 and disengaging first gear.

When the second solenoid valve is opened, fluid is supplied to passages 15a/15 and 13 and the second gear is engaged in the same manner as the first.

Thus, every time the joystick is moved in said one direction, the solenoid valve (if any) which is open, is closed, and the next solenoid valve in the sequence 50,60, 70,80 is opened, to engage the next higher gear. Every time the joystick is moved in the opposite direction, the solenoid valve which was open is closed, and next solenoid valve in the sequence 80,70,60,50 is opened to engage the next lower gear.

It is envisaged that the solenoid valves could be controlled automatically by a rev-counter, so that the gears are changed up or down automatically, depending upon the engine revs.

What is claimed is:

1. A gearbox adaptor comprising:
   a hub defining a longitudinal axis adapted to be engageable with a gear shaft for rotation therewith;
   at least one piston mounted within said hub;
   means for supplying fluid through at least one passage on an exterior of the hub to an interior passage in the hub adjacent the at least one piston in a radially inwardly flow direction towards the longitudinal axis of the hub to pressurize a first face of said at least one piston so as to move said at least one piston in a first direction;
   at least one gear locatable on said gear shaft adjacent said hub;
   at least one clutch means positioned between said at least one piston and a side wall of said at least one gear, part of said at least one clutch means being engaged with said hub and a different part of said clutch means being engageable with said at least one gear;
   wherein said at least one gear is freely rotatable relative to said shaft, and said at least one clutch means being located and arranged such that movement of said at least one piston in said first direction inter-engages said parts of said at least one clutch means to drivingly engage said at least one gear with said gear shaft.

2. The gearbox adaptor as claimed in claim 1 wherein said hub, said at least one piston, and said at least one clutch means are all concentric and said hub is adapted to be concentrically engageable with said gear shaft.

3. The gearbox adaptor as claimed in claim 2 wherein said at least one piston and said at least one clutch means are both annular.

4. The gearbox adaptor as claimed in claim 2 wherein said at least one clutch means comprises a clutch pack which comprises a first series of spaced plates, each of which is engaged with the hub for rotation therewith but which is reciprocable parallel to the longitudinal axis of said hub; and
   a second series of spaced plates, each of which is engageable with said at least on gear mounted upon said gear shaft but which is reciprocable parallel to the longitudinal axis of said hub;
   said second series of plates being interleaved with the plates of said first series.

5. The gearbox adaptor as claimed in claim 4 wherein said first series of spaced plates are engaged with an inner surface of said hub and said second series of spaced plates are engaged with an outer surface of a boss that surrounds the shaft and protrudes from a central region of the side wall of said at least one gear.

6. The gearbox adaptor as claimed in claim 5 wherein said first and second series of spaced plates and said at least one piston are all disc shaped, each having a central opening into which said boss protrudes.

7. The gearbox adaptor as claimed in claim 2 wherein said at least one clutch means and said at least one piston are mounted in a recess in said hub.

8. The gearbox adaptor as claimed in claim 7 further comprising a casing surrounding at least part of the exterior of said hub;
   a first fluid passage being formed between an interior of the casing and the exterior of the hub, said first fluid passage being in communication with said means for supplying fluid to the first face of said at east one piston; and
   a second fluid passage formed in said hub.

9. The gearbox adaptor as claimed in claim 1 wherein said fluid is hydraulic fluid.

10. The gearbox adaptor as claimed in claim 1 wherein said fluid is pneumatic fluid.

11. The gearbox adaptor as claimed in claim 1 further comprising a standard gearbox comprising a plurality of gears; wherein the gearbox adaptor is fitted to each gear of the standard gearbox.

12. A sequential gearbox comprising a standard gearbox comprising a plurality of gears and two or more gearbox adaptors as claimed in claim 1, each of the gearbox adaptor being fitted to the plurality gears of the standard gearbox with part of each hub of each gearbox adaptor mounted on the gear shaft and each clutch means of each gearbox adaptor engaged with a corresponding gear of said standard gearbox, said sequential gearbox further including electronic control means which comprises two micro-switches connected via a sequencing arrangement to a set of solenoid valves, each solenoid valve being connected to the means for supplying fluid to each piston of the two or more gearbox adaptors such that fluid is supplied to said piston when said solenoid valve is opened and fluid is withdrawn from said piston when said solenoid valve is closed;
   the electronic control means being such that each time the first micro-switch is closed, the sequencing arrangement closes any solenoid valve that is opened and opens the next solenoid valve in a predetermined first sequence; and
   each time the second micro-switch is closed, the sequencing arrangement closes any solenoid valve that is opened and opens the next solenoid valve in a predetermined second sequence.

13. The sequential gearbox as claimed in claim 12, wherein said predetermined second sequence is the reverse of said predetermined first sequence.

14. The gearbox adaptor as claimed in claim 1 further comprising a second piston and a second clutch means, the at least one piston and the at least one clutch means being mounted in a first recess formed in one end of the hub, and the second piston and the second clutch means being mounted in a second recess formed in a second end of the hub;
   wherein part of the at least one clutch means is engageable with the at least one gear and part of the second clutch means is engageable with a second gear.

15. A sequential gearbox comprising a standard gearbox comprising a plurality of gears with a gearbox adaptor as claimed in claim 14 fitted between each pair of adjacent gears, with part of each hub of each gearbox adaptor mounted on the gear shaft between said pair of adjacent gears and part of the at least one clutch means engaged with one of said gears of said pair of adjacent gears and part of the second clutch means engaged with the other of said gears or said pair of adjacent gears, further including electronic control means, which comprises two micro-switches connected via a sequencing arrangement to a set of solenoid valves, each solenoid valve being connected to the means for supplying fluid to each piston of the gearbox adaptor such that fluid is supplied to said piston by said solenoid valve when said solenoid valve is opened and fluid is withdrawn from said piston when said solenoid valve is closed; the electronic control means being such that each time the first micro-switch is closed, the sequencing arrangement closes any solenoid valve that is opened and opens the next solenoid valve in a predetermined first sequence; and each time the second micro-switch is closed, the sequencing arrangement closes any solenoid valve that is opened and opens the next solenoid valve in a predetermined second sequence.

16. The sequential gearbox as claimed in claim 15 wherein said predetermined second sequence is the reverse of said predetermined first sequence.

17. The gearbox adaptor as claimed in claim 14 further comprising a casing surrounding at least part of the exterior of said hub; and
   a second fluid passage formed between the interior of the casing and the exterior of the hub, the first fluid passage and the second fluid passage being adapted for fluid communication with the means for supplying fluid.

18. The gearbox adaptor as claimed in claim 14 further comprising a standard gearbox comprising a plurality of gears, wherein the gearbox adaptor is fitted between a pair of adjacent gears of the standard gearbox.

19. A gearbox comprising:
   a casing defining a longitudinal axis comprising a wall and at least one passage through the wall having a section extending substantially perpendicularly to the longitudinal axis of the casing;
   a hub defining a longitudinal axis comprising a central portion, at least one annular recess, and at least one passage, the hub being coaxially disposed with the casing;
   at least one piston positioned at least partially within the at least one annular recess of the hub;
   an interior passage located between the at least one piston and the central portion of the hub in fluid communication with the at least one passage of the hub;
   a fluid supply source for supplying fluid through the at least one passage of the casing and the at least one passage of the hub to the interior passage in an inwardly flow direction to pressurize a first face of said at least one piston so as to move said at least one piston in a first direction;
   at least one gear locatable on a shaft adjacent said hub;
   at least one clutch pack positioned between said at least one piston and said at least one gear, part of said at least one clutch pack being engaged with said hub and a different part of said clutch pack being engageable with said at least one gear;
   wherein said at least one gear is freely rotatable relative to said shaft, and said at least one clutch pack being located and arranged such that movement of said at least one piston in said first direction inter-engages said parts of said at least one clutch pack to drivingly engage said at least one gear with said shaft.

20. The gearbox as claimed in claim 19, further comprising a second annular recess and a second piston positioned at least partially within the second annular recess.

21. The gearbox as claimed in claim 19, further comprising a second passage through the wall of the casing.

22. The gearbox as claimed in claim 19, further comprising a control system for controlling fluid flow from the fluid supply source.

23. The gearbox as claimed in claim 22, further comprising at least one solenoid valve.

24. The gearbox as claimed in claim 19, further comprising a second piston, a second interior passage, a second gear, and a second clutch pack.

25. The gearbox as claimed in claim 19, wherein the part of the clutch pack comprises a plurality of splines or dogs adapted to mesh with corresponding grooves or splines located in the hub.

26. The gearbox as claimed in claim 19, wherein the inwardly flow direction comprises a radial flow direction.

27. A gearbox for sequentially rotating a plurality of gears mounted on a gear shaft comprising a hub, two pistons each comprising an outside diameter arid an inside diameter, and two clutch packs mounted inside a casing between two gears;
   a fluid supply source for selectively supplying fluid to one of the two pistons to pressurize one side of said piston;
   wherein each clutch pack comprises a first pack part in rotational relationship with the hub and a second pack part in rotational relationship with one of the gears;
   wherein when fluid pressurizes one side of one of the pistons, the piston moves in a first direction to push the first pack part to matingly engage the second pack part to then cause the gear, to which the second pack part is in rotational relationship, to be in rotational relationship with the hub; and
   wherein pressurized fluid passes through a passage in a wall of the casing and a passage in the hub and flows towards the piston from the outside diameter portion of the piston towards the inside diameter portion of the piston.

28. The gearbox as claimed in claim 27, further comprising two interior passages located between the two pistons and the hub.

29. The gearbox as claimed in claim 27, wherein one of the gears has a greater outside diameter than the other gear.

30. The gearbox as claimed in claim 27, further comprising a second passage in the wall of the casing and a second passage in the hub.

31. The gearbox as claimed in claim 27, further comprising a control system for controlling fluid flow from the fluid supply source.

32. The gearbox as claimed in claim 31, further comprising at least one solenoid valve.

* * * * *